(12) United States Patent
Basaglia et al.

(10) Patent No.: US 8,215,477 B2
(45) Date of Patent: Jul. 10, 2012

(54) ARCHIMEDES SCREW FOR USE IN CONVEYORS, COMPACTORS AND THE LIKE

(75) Inventors: Gianni Basaglia, San Prospero (IT); Marco Gaddi, San Prospero (IT); Massimo Passerini, Mirabello (IT)

(73) Assignee: WAM Industriale S.p.A., Modena (IT)

( * ) Notice: Subject to any disclaimer, the term of this patent is extended or adjusted under 35 U.S.C. 154(b) by 363 days.

(21) Appl. No.: 12/305,326

(22) PCT Filed: May 29, 2007

(86) PCT No.: PCT/IB2007/001495
§ 371 (c)(1),
(2), (4) Date: Dec. 17, 2008

(87) PCT Pub. No.: WO2008/001171
PCT Pub. Date: Jan. 3, 2008

(65) Prior Publication Data
US 2009/0183971 A1    Jul. 23, 2009

(30) Foreign Application Priority Data
Jun. 27, 2006   (IT) .............................. MO2006A0207

(51) Int. Cl.
*B65G 33/26* (2006.01)
(52) U.S. Cl. ......... 198/666; 198/662; 198/657; 198/677
(58) Field of Classification Search ................... 198/657, 198/659, 662, 666, 670, 671, 676, 677, 467.1, 198/550.1, 550.6; 100/337, 104, 117, 145
See application file for complete search history.

(56) References Cited

U.S. PATENT DOCUMENTS

| | | | | | |
|---|---|---|---|---|---|
| 233,320 | A | * | 10/1880 | Brewer | 198/664 |
| 647,354 | A | * | 4/1900 | Anderson | 100/98 R |
| 836,701 | A | * | 11/1906 | Oliver | 100/145 |
| 2,335,819 | A | | 11/1943 | Upton | |
| 2,397,305 | A | * | 3/1946 | Wheat | 198/676 |
| 3,069,873 | A | * | 12/1962 | Whitlock | 464/182 |
| 3,280,963 | A | * | 10/1966 | Kirker, Jr. | 198/677 |
| 3,644,103 | A | * | 2/1972 | Yoon et al. | 552/545 |
| 3,684,082 | A | * | 8/1972 | Wardell | 198/493 |
| 3,688,687 | A | * | 9/1972 | Craig et al. | 100/117 |
| 3,705,644 | A | | 12/1972 | Kawchitch | |
| 3,967,722 | A | * | 7/1976 | Dietert | 198/659 |
| 3,980,013 | A | * | 9/1976 | Bredeson | 100/117 |
| 4,150,617 | A | * | 4/1979 | Schramm et al. | 100/117 |
| 4,167,339 | A | * | 9/1979 | Anders | 366/79 |

(Continued)

FOREIGN PATENT DOCUMENTS

EP    0 200 117 A2    11/1986

(Continued)

*Primary Examiner* — Gene Crawford
*Assistant Examiner* — William R Harp
(74) *Attorney, Agent, or Firm* — Pearne & Gordon LLP

(57) ABSTRACT

The archimedes screw (1) for use in conveyors, compactors and the like, comprises a shaft (2) on which a helix (3) is coupled, which screw rotates internally of a containing structure, wherein the archimedes screw (1) comprises a plurality of sections (4a, 4b, 4c, 4d . . . 4n) which can be threaded coaxially and solidly in rotation on a central shaft which defines the shaft (2) of the archimedes screw, each of which plurality of sections exhibits different constructional and functional characteristics from other of the plurality of sections.

12 Claims, 2 Drawing Sheets

U.S. PATENT DOCUMENTS

| | | | | |
|---|---|---|---|---|
| 4,192,418 A | * | 3/1980 | Montgomery | 198/659 |
| 4,223,601 A | * | 9/1980 | Knuth et al. | 100/117 |
| 4,397,231 A | * | 8/1983 | Burgin | 100/117 |
| 4,600,311 A | | 7/1986 | Mourrier et al. | |
| 4,621,968 A | * | 11/1986 | Hutchison | 414/311 |
| 4,746,220 A | | 5/1988 | Sukai et al. | |
| 4,747,343 A | * | 5/1988 | St. Clair | 100/145 |
| 4,838,700 A | * | 6/1989 | Williamson | 366/89 |
| 4,852,719 A | * | 8/1989 | Lapeyre | 198/666 |
| 4,859,322 A | * | 8/1989 | Huber | 210/162 |
| 4,976,341 A | | 12/1990 | Lundell | |
| 5,088,397 A | * | 2/1992 | Mansfield et al. | 100/145 |
| 5,099,985 A | * | 3/1992 | Lapeyre | 198/658 |
| 5,335,866 A | * | 8/1994 | Narao | 241/46.013 |
| 5,341,730 A | | 8/1994 | Tydiks | |
| 5,833,851 A | * | 11/1998 | Adams et al. | 210/413 |

FOREIGN PATENT DOCUMENTS

| | | |
|---|---|---|
| EP | 0 571 750 A1 | 12/1993 |
| JP | 59 113997 A | 6/1984 |
| JP | 05 023892 A | 2/1993 |
| WO | 97/43113 A1 | 11/1997 |

* cited by examiner

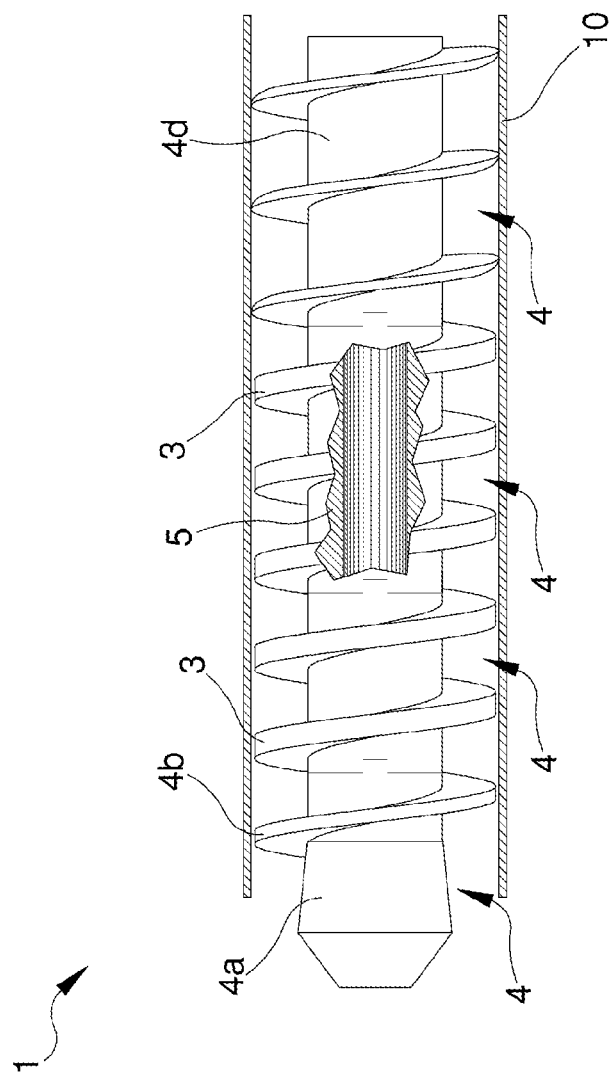

ARCHIMEDES SCREW FOR USE IN CONVEYORS, COMPACTORS AND THE LIKE

TECHNICAL FIELD

The invention relates to an archimedes screw which is usable in conveyors, compactors and the like, i.e. machines which operate on products or mixtures of products to be transported or separated by means of a screw conveyor, machines which operate on mixtures containing liquids which must be separated from solid parts such as for example damp refuse and the like.

More specifically, the invention is particularly useful in all machines in which the screw rotates internally of a sieve-conformed containing structure and pushes the material which does not pass through the sieve towards an outlet mouth located at the end of the screw conveyor.

BACKGROUND ART

The aim of the present invention is to rationalise and improve the realisation of the screws in order to reduce to a minimum the drawbacks which obtain during use of the screws themselves, such as for example the encrustations which form on the screw and on the containing structure, the blocking of holes (if present) in the containing structure, blockages which can occur at the screw outlet, problems connected with wear and with the replacement of the various parts constituting the screw and the containing structure.

An advantage of the invention is that it improves the distribution of the product exiting from the terminal part of the screw.

A further advantage of the invention is that it optimises the power needed to operate the screw, and consequently optimises use of the driving power needed to operate the screw.

SUMMARY OF THE INVENTION

These aims and more besides are all attained by the invention as it is characterised in the claims that follow.

BRIEF DESCRIPTION OF THE DRAWINGS

Further characteristics and advantages of the present invention will better emerge from the detailed description that follows of a preferred but not exclusive embodiment of the invention, illustrated purely by way of non-limiting example in the accompanying figures of the drawings, in which:

FIG. 9 is a schematic view of a screw of the invention located within a containing structure.

DISCLOSURE OF INVENTION

Figure 1:
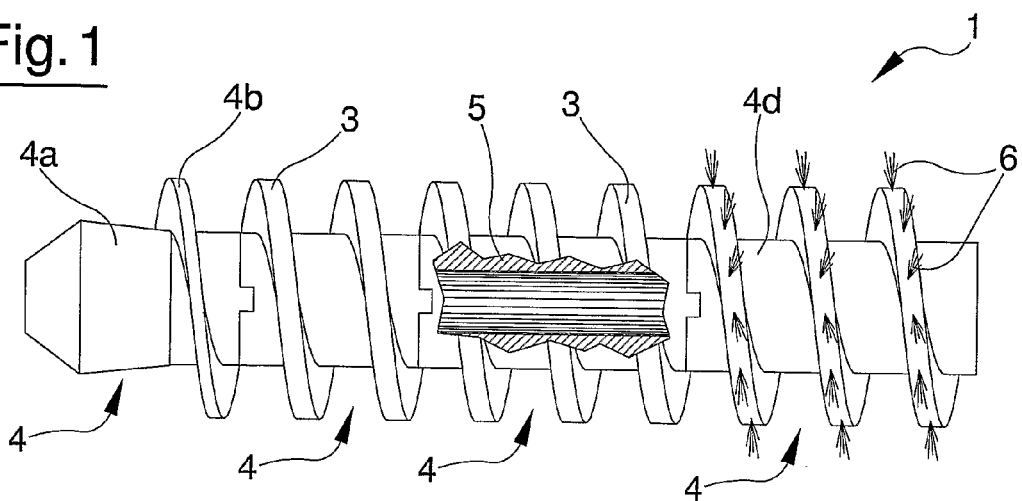
FIG. 1 is a schematic lateral view in vertical elevation, with some parts removed better to evidence others, of the screw of the invention.
Figure 2:
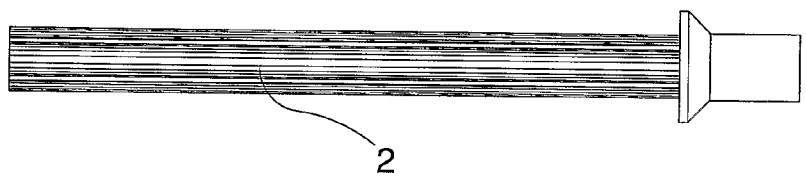
FIG. 2 is a view of the central shaft of the screw of the machine of the invention.

The screw 1 of the invention is normally used internally of a containing structure (for example a sieve or a containing box as of known type) in the field of conveyors, compactors, liquid draining machines, mixers and the like; normally, and according to a known functioning, the screw is rotated internally of the containing structure in order to advance the products transported by the screw itself along the axis thereof, more precisely by the helix 3 of the screw, which helix 3 is wound about a central axis 2 of the screw. FIG. 9 shows a screw located within a containing structure 10.

The screw comprises a plurality of sections 4 which are distinct from one another and which can be threaded onto a central shaft 2 constituting the axis of the screw and being connected to a motor group, not illustrated in the figures, from which it receives rotating drive. The various sections are solid in rotation with the central shaft 2, which is preferably a grooved shaft, and can each exhibit different constructional and functional characteristics from the others.

At least some of the sections comprise a metal central sleeve 5, preferably grooved, which threads onto the central shaft and couples in rotation with the central shaft; in these sections the central sleeve is sunk into a plastic material with which the external part of the section is made.

While in the various sections the external part defines the helix 3 of the screw, there is a particular section 4a, arranged in proximity of the terminal part of the screw, which exhibits an external part having a nose shape; this section is fixed to the terminal part of the screw either by screwing or by being screwed on by screws, or by radial pins, or any other known system, preferably a removable system. This particular section is conveniently used in a case in which the screw pushes material towards a discharge mouth which is often provided with a contrast element, not shown in the figures of the drawings, which further compacts the material pushed by the screw. This conformation is typical, for example, in machines for separating a liquid part from a solid-liquid mixture in which the liquid part exits from a containing structure having a sieve while the solid part is pushed by the helix of the screw towards a terminal exit mouth.

The tip section, being the final section threaded on the shaft, is advantageously fixed axially on the shaft and also has the function of "fastening" the various sections of the screw in order to prevent the unthreading thereof from the shaft in an axial direction.

Figure 3:
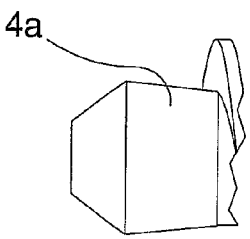
FIGS. 3, 4, 5, 6, 7, 8 are schematic views of various possible embodiments of the tip of the screw of the invention.
Figure 6:
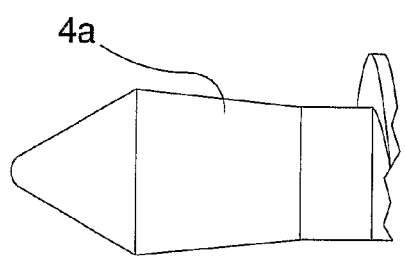

The tip section 4a can take various shapes, some of which are illustrated in figures from 3 to 8, according to the function they are to carry out. The tips of FIGS. 3 and 6 have, for example, a shape which is at least partially divergent so that they can direct the material towards the internal wall of the containing structure; this makes the "squeezing" effect of the mixture exiting the machine even more effective. The possible presence, as illustrated in the figures, of a convergent terminal part prevents any material blocking problems.

Naturally, according to the type of discharge mouth and contrast element used, the tip can assume different shapes for conveying the mixture into the desired zones of the discharge mouth.

Figure 4:
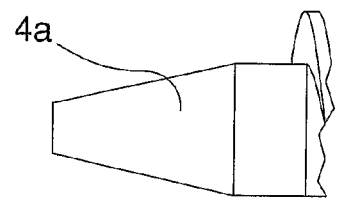
Figure 5:
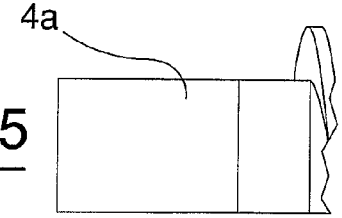
Figure 7:
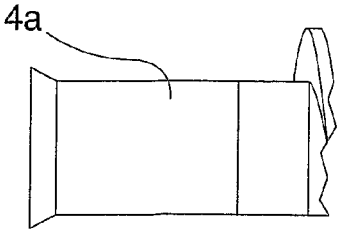
Figure 8:
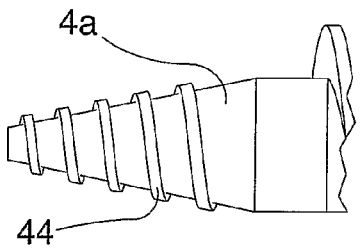

For example, tips can be used which have at least a cylindrical part, such as those illustrated in FIGS. 5 and 7, which enable a tubular shape of the material exiting to be formed; as illustrated in FIG. 7, it is also possible to apply a divergent terminal part to the tip, should it be desirable to interpose a further obstacle to axial movement of the material or to further compress the material against the internal wall of the containing structure. Tips can also be used, such as those illustrated in FIGS. 4 and 8, which have a converging conical end part, for example in order to prevent the exiting of the material only in the central part of the discharge mouth. As illustrated in FIG. 8, a peripheral helix 44 can also be applied to the conical part of the tips, which peripheral helix 44 is aimed at breaking the continuity of the flow of material exiting the screw.

The tips can also be made of metal, in a plastic material or of metal and coated with a plastic material.

In any case, independently of their shape and the material they are made of, the tip sections do not have the function of pushing the product in an axial direction (this function is performed by the helix of the screw), but have only the function of orienting and directing the flow of material either towards the internal wall of the containing structure or towards particular zones of the outlet mouth of the screw.

In order to make the machine operation more efficient, and to rationalise the construction thereof, the various sections defining the helix of the screw can be differentiated from one another.

In particular, at least one of the sections 4n (4d in the figures) located at the start of the screw can be provided with projecting flexible bristles 6, afforded on the head of the helix, or the helix can be made of sections with softer plastic material with respect to the plastic material of which the helices of the other plastic sections are made, and can have a greater diameter than the diameter of the internal wall of the containing structure within which the screw rotates (see FIG. 9); in this way, during the rotation of the screw, the bristles or the soft helix come into contact with the internal wall of the containing structure, cleaning it and making the functioning thereof more efficient.

At least one of the sections located at the start of the screw can be provided with protuberances, fashioned on the head of the screw and not illustrated in the figures of the drawings, which protuberances come into contact with the internal wall of the containing structure during the rotation of the screw; in this case too the screw functioning is enhanced as the protuberances cause a shaking of the containing structure which facilitates the cleaning thereof.

All of these "special" sections are realised in proximity of the start of the screw, where, generally, the product being worked is more fluid and does not offer excessive resistance to advancement.

In the screw zone close to the terminal part of the archimedes screw, it is advantageous, especially for the immediately upstream section of the final tip section, to use a section 4b made completely of metal; this is because, in this zone, the product being worked is generally more compact and therefore exerts a stress on the helix of the screw which might cause deformations in helices made of plastic.

The structure of the above-described screw enables an efficient orienting and directing action on the material exiting from the screw, with a consequent facilitating of the final discharge of the material.

The special conformation of the screw further enables an easy and rapid mounting and dismounting of the screw and an easy and rapid maintenance thereof, even where it is necessary to replace a worn or damaged section of the screw; this also leads to advantages as regards stocking of the spare parts, which can be limited to the parts of the screw which are most subject to wear.

Further, the conformation enables a distinction to be made in the constructional characteristics of the various sections of the screw, so as to operate, in the various zones of the machine containing the screw, in the best way in accordance with the consistency and type of product being worked; the use of differentiated sections, assemblable to one another, in the various parts of the screw, further enables use of a smaller quantity of material and a better-gauged quantity of material according to the various zones of the screw.

The invention claimed is:

1. An archimedes screw (1) for use rotating internally of a containing structure, the archimedes screw being located within the containing structure and comprising a shaft (2) and a helix (3), the helix (3) being coupled to the shaft (2), the shaft (2) comprising a central pin, wherein the archimedes screw (1) further comprises a plurality of sections which are threaded coaxially and solidly in rotation on the central pin, each of which plurality of sections exhibits different constructional and functional characteristics from others of the plurality of sections, wherein at least one of the sections (4b) located immediately upstream of a final section (4a) of the archimedes screw is made completely of metal, wherein at least some of the sections comprise a metal central sleeve (5) which couples with the shaft, which metal central sleeve (5) is sunk in a plastic material so that a portion of the helix (3) of the section is made of the plastic material in which the metal central sleeve (5) is sunk, wherein at least one of the first sections of the archimedes screw, located in proximity of a most upstream part of the archimedes screw, comprises a first portion of helix made of a softer plastic material than a plastic material with which a portion of helix of another section is made of, which first portion of helix is conformed such that, during a rotation of the screw, the first portion comes into contact with an internal wall of the containing structure.

2. The archimedes screw of claim 1, wherein the first portion of helix has a greater diameter than a diameter of the internal wall of the containing structure in which the archimedes screw rotates.

3. The archimedes screw of claim 1, wherein the final section (4a) of the archimedes screw, located on a terminal part of the archimedes screw, has a tip which is tip-shaped and directs, according to directions defined by a shape of the tip, the material transported by the helix of the archimedes screw.

4. The archimedes screw of claim 1, wherein the tip has an at least partially diverging shape.

5. The archimedes screw of claim 1, wherein the tip has an at least partially converging conical shape.

6. The archimedes screw of claim 5, wherein the tip comprises a helix arranged about the converging conical part.

7. The archimedes screw of claim 3, wherein the tip has an at least partially cylindrical shape.

8. The archimedes screw of claim 7, wherein the tip comprises a diverging terminal part applied at an end of the cylindrical part.

9. The archimedes screw of claim 1, wherein at least one of the first sections of the archimedes screw comprises flexible bristles positioned on an outermost surface of a portion of helix, which bristles come into contact with the internal wall of the containing structure in which the archimedes screw rotates.

10. The archimedes screw of claim 1, wherein at least one of the first sections of the archimedes screw comprises protuberances, fashioned on an outermost surface of a portion of helix, which come into contact with the internal wall of the containing structure in which the archimedes screw rotates.

11. A method for compacting mixtures containing liquids, comprising the steps of: introducing the mixture in a sieve-conformed containing structure; and advancing the mixture along the sieve-conformed containing structure by means of an archimedes screw according to claim 1.

12. A method according to claim 11, wherein the step of advancing the mixture along the sieve-conformed containing structure is performed by means of said at least one of the first sections of the archimedes screw.

* * * * *

UNITED STATES PATENT AND TRADEMARK OFFICE
CERTIFICATE OF CORRECTION

PATENT NO.         : 8,215,477 B2                                    Page 1 of 1
APPLICATION NO.    : 12/305326
DATED              : July 10, 2012
INVENTOR(S)        : Gianni Basaglia It is certified that error appears in the above-identified patent and that said Letters Patent is hereby corrected as shown below:

In column 4, line 35, being line 1 in Claim 4, please delete "claim 1" and insert therefor --claim 3--.

In column 4, line 37, being line 1 in Claim 5, please delete "claim 1" and insert therefor --claim 3--.

Signed and Sealed this
Eighteenth Day of September, 2012

David J. Kappos
*Director of the United States Patent and Trademark Office*